Patented Dec. 1, 1953

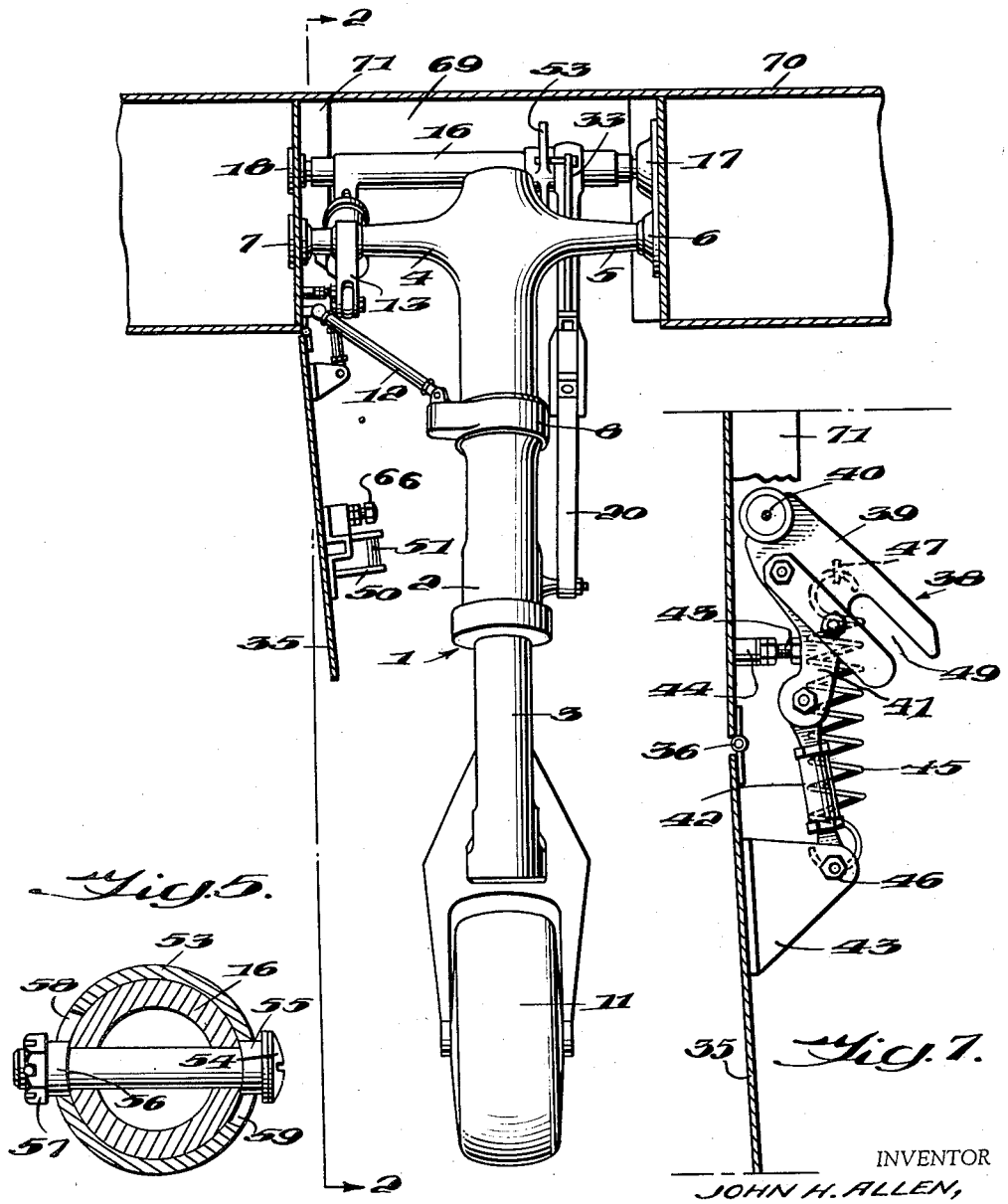

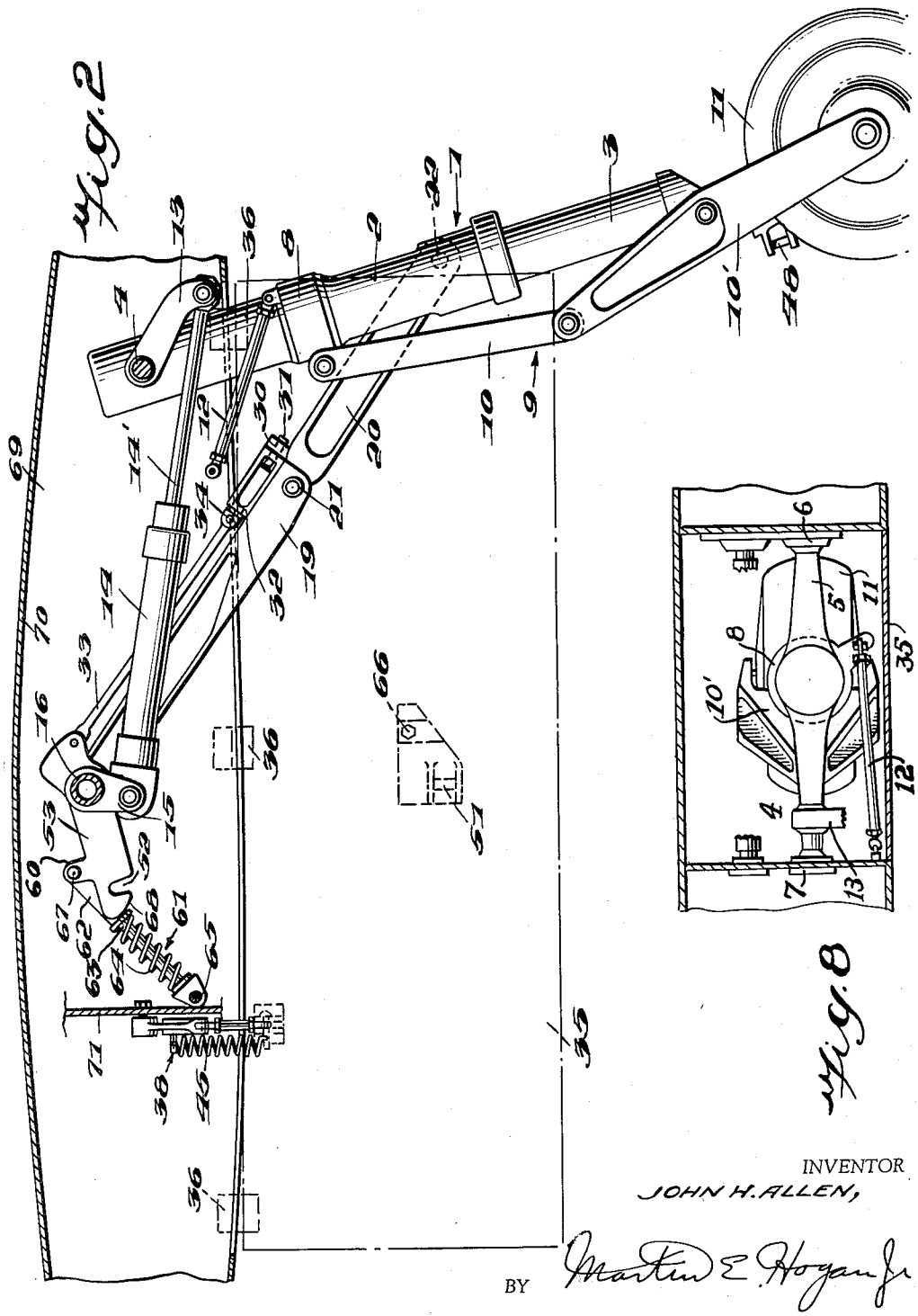

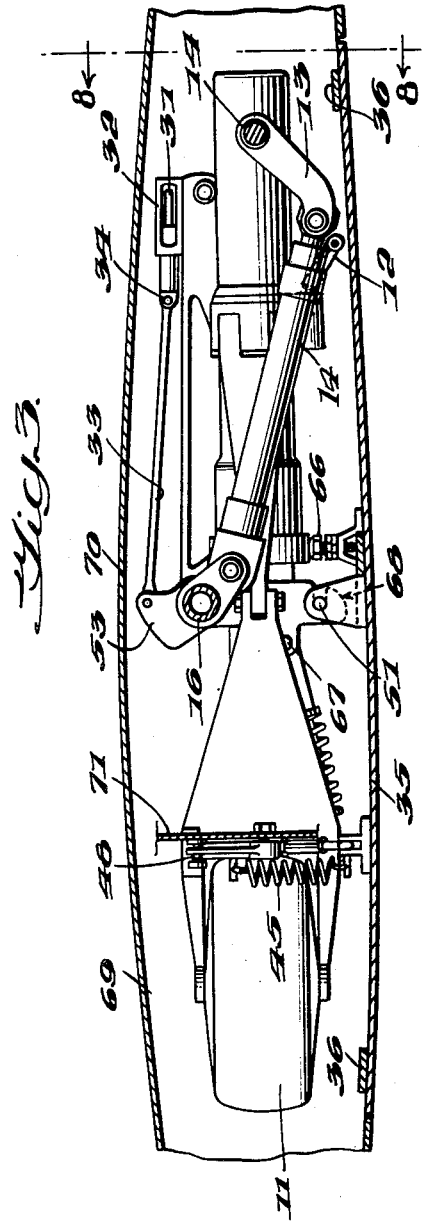
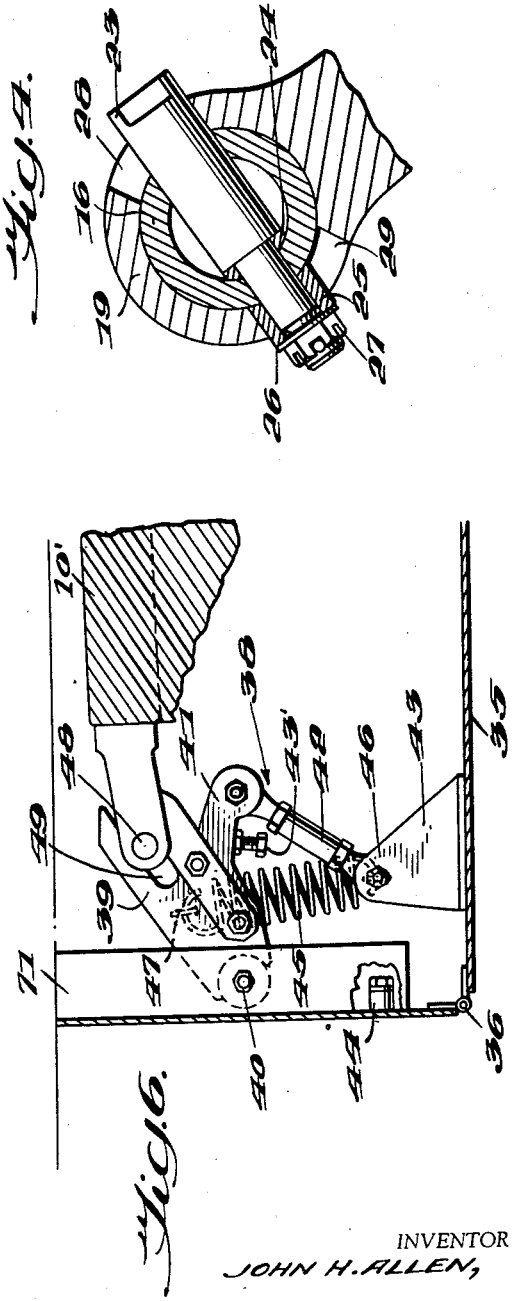

2,661,171

UNITED STATES PATENT OFFICE 2,661,171

UP AND DOWN LOCK MECHANISM FOR RETRACTABLE LANDING GEAR FOR AIRCRAFT

John H. Allen, Baltimore, Md., assignor to The Glenn L. Martin Company, Middle River, Md., a corporation of Maryland Application October 11, 1951, Serial No. 250,930

8 Claims. (Cl. 244—102)

This invention relates to a retractable landing gear for an aircraft, and more particularly to a new and improved arrangement for locking such a gear in either extended or retracted position.

In a retractable landing gear arrangement for an aircraft, means must be provided for locking the gear in its extended position for take-off and landing, and in its retracted position during flight. If the controls provided for such locks are separate from those provided for the extension and retraction of the landing gear, the pilot must manipulate the controls separately and in the proper sequence for extending or retracting the gear. Obviously, it is desirable to provide an arrangement in which the locking and unlocking operations are automatic, thus greatly simplifying the manipulations required of the pilot.

In addition to the aforesaid considerations, a locking system must be compactly arranged so as to permit its being housed within a limited space, such as the thickness of an aircraft wing, or within a compartment of limited size in a fuselage. To obtain such compactness, it is desirable to reduce the number of component parts by eliminating separate actuating means for the landing gear and the locks and to provide instead, a single actuator for operating both the gear and the locking means.

The improved arrangement of the present invention obviates the complications of added weight and complexity of prior systems which have used separate actuating means for the landing gear and the locking means, and provides a greatly simplified and improved arrangement for automatically operating the locks and the gear in the proper sequence.

It is therefore an object of the present invention to provide an improved operating and locking mechanism for an aircraft landing gear comprising a novel arrangement of its components such that it is adapted for fully automatic operation.

It is another object of this invention to provide a locking arrangement for a landing gear operable from the gear actuating mechanism thereby eliminating the necessity for a separate actuator for the locking means.

It is a further object of this invention to provide a simplified operating and locking mechanism which is compactly arranged so as to permit its being housed within a limited space.

Other objects and advantages of this invention will be apparent from the following description taken in connection with the following drawings.

In the drawing:

Figure 1 is a rear elevation view of the landing gear in its extended position with the landing gear door open and showing the turning link arrangement.

Figure 2 is a section taken on line 2—2 of Figure 1 but showing the landing gear door in phantom for clarity.

Figure 3 is a side elevation view showing the gear in its retracted and locked position.

Figure 4 is a fragmentary sectional view showing the details of the lost motion connection between the upper drag strut arm and the crankshaft.

Figure 5 is a fragmentary sectional view showing the details of the lost motion connection between the uplock lever and the crankshaft.

Figure 6 is a fragmentary view of the door operating linkage with the door in closed position.

Figure 7 is a fragmentary view of the door operating linkage with the door open.

Figure 8 is a fragmentary sectional view taken on line 8—8 of Figure 3.

In Figure 1, the landing gear is shown as including a main shock strut 1 of conventional design consisting of an upper cylinder member 2, and a lower piston member 3 resiliently telescopic in an axial direction within the cylinder member. The upper end of the cylinder member 2 is provided with trunnions 4 and 5, the outer ends of which are rotatably supported by bearings 6 and 7 so that shock strut 1 may swing between an extended operative position and a retracted position within the stowage compartment 69 formed by the structure of the wing 70.

To extend and retract the gear, a hydraulic actuating cylinder 14 is provided as shown in Figure 2. Piston rod 14' of the cylinder is pivotally connected to crank arm 13 which is rigidly carried by trunnion 4. The other end of the cylinder is connected to crank arm 15 which is an integral part of crankshaft 16, the crankshaft, in turn, being rotatably mounted in bearings 17 and 18.

Since the landing gear arrangement described herein is designed to be housed, when retracted, in a high speed wing having a relatively thin cross section, it is necessary to provide means for rotating the wheel 11 in a lateral direction during the retraction cycle so that the wheel will lie flat within the stowage compartment 69 when retracted, as shown in Figure 3. For this purpose, cylinder member 2 of the shock strut 1 carries a rotatable collar 8 to which is pivotally attached one end of the upper member 10 of a scissors linkage 9, the lower member 10' of the linkage being pivoted at its midpoint on the lower end of piston member 3, wheel 11 being rotatably mounted on the lower end of linkage member 10'. Turning link 12 is swivelly attached at one of its ends to the aircraft structure, the other end being attached to collar 8, thus preventing rotation of the collar, linkage 9, and the wheel 11 with respect to cylinder member 2 when the gear is in its extended position. As the gear is retracted, link 12, being of constant length, will cause collar 8 to rotate about the upper cylinder member 2, thereby rotating linkage 9 and wheel 11 through approximately 90° to the position shown in Figure 3 and Figure 8.

A folding drag strut consisting of an upper arm 19 and a lower arm 20 pivotally connected together by pin 21 is provided in the landing gear to brace main strut 1 when it is in an extended position. One end of the drag strut is attached to the main shock strut 1 at pivot 22, the other end being connected to crankshaft 16 with freedom for lost motion with respect thereto as hereinafter described.

Referring now to Figure 4, upper drag strut arm 19 is shown rotatably mounted on crankshaft 16 and is provided with a pair of diametrically opposed slots 28 and 29. Pin 23 which is inserted in crankshaft 16 and is rigidly fastened thereto by means of nut 27, has its opposite ends extending into the aforementioned slots, the ends of the slots acting as stops for the pin to limit the rotation of crankshaft 16 with respect to the upper arm 19. Washer 24 provides a firm seat for the shoulder of pin 23 against the inner circumference of crankshaft 16, and collar 25 provides a seat for washer 26 under nut 27.

To maintain the drag strut in its extended position a locking device as shown in Figure 2 is provided. A lug 30 rigidly carried by the lower arm 20 is adapted to receive a sliding locking pin 31 which protrudes from guide block 32 rigidly carried by upper arm 19. Pin 31 is actuated by push-pull rod 33, one end of which is attached to the pin at pivot 34, the other end being attached to uplock lever 53.

Landing gear door 35 is attached to the aircraft structure by means of hinges 36 and is adapted to swing into place beneath the landing gear as the gear moves into its retracted position. The door operating linkage 38 comprises a slotted lever 39 attached to a structural member 71 of wing 70 by pivot 40 and carrying arm 41 to which is pivotally attached one end end of link 42. The other end of the link is pivoted in bracket 43, the bracket being fixed to door 35. Bumper 43' is fixed to arm 41 and is arranged to strike stop 44 carried by the structural member 71 to limit the rotation of lever 39. Tension spring 45 is fastened at one end to pin 46 in bracket 43 and at the other end to pin 47 carried by lever 39, the force thus exerted by the spring when the door is fully open tending to rotate lever 39 against stop 44 and holding the door in open position as shown in Figure 7.

The door operating linkage 38 is actuated by pin 48 rigidly carried by lower member 10' of scissors linkage 9 and positioned so as to engage the slot 49 in lever 39 as the gear approaches its retracted position, thus rotating lever 39 in a direction to close door 35. When the gear is being extended, pin 48 will rotate lever 39 in the opposite direction to open the door 35.

For locking the door in its closed position, bracket 50, which carries pin 51, is attached to the inside of the door, the pin 51 being adapted to be engaged by slot 52 in the uplock lever 53. As is shown in Figure 5, the uplock lever is rotatably mounted on crankshaft 16 and is provided with diametrically opposed slots 58 and 59. Passing through crankshaft 16 and fastened thereto by means of nut 57 is bolt 54, spacers 55 and 56 providing bearing surfaces for the head of the bolt and the nut 57 and extending into the slots 58 and 59. The ends of the slots, acting as stops for the bolt 54, serve to limit the relative rotation of the uplock lever with respect to the crankshaft.

Bracket 50 on the door 35 also carries pad 66, which serves to support the gear in its retracted position, the lower portion of cylinder member 2 resting on the pad when door 35 is closed and locked as shown in Figure 3.

A spring urged link 61 comprising a lug 62 which slides on rod 63 against the action of spring 64 is pivotally attached at one end to arm 60 of lever 53, and at its other end to the aircraft structure at pivot 65, as shown in Figure 2, the link 61 forming with lever 53 an overcenter, spring-urged toggle tending to rotate the lever 53 to one or the other limit of its relative rotation about crankshaft 16, depending upon the position of the crank shaft and the lever.

In operation, when it is desired to move the gear from retracted to extended position, cylinder 14 is actuated to extend piston rod 14' thus simultaneously exerting forces on crank arms 13 and 15, the force on arm 13 being ineffective to swing the gear while it is held in retracted position by the pad 66 on the locked door 35 because of the lost motion between the upper drag strut arm 19 and the crankshaft. At the same time the force exerted by the cylinder is effective to rotate crankshaft 16, the link 64 exerting a force tending to rotate uplock lever 53 to the limit of its relative motion with respect to crankshaft 16 in a direction opposed to the rotation of the crankshaft, so that bolt 54 bears against the ends of the slots 58 and 59, and the rotation of the crankshaft rotates lever 53 against the action of spring 64, thus disengaging the uplock lever from pin 51 and unlocking the door 35. At this point, crankshaft 16 will have rotated far enough so that pin 23 will strike the ends of slots 28 and 29, the force exerted by cylinder 14 then being effective to start to swing the gear toward its extended position. At the same time the downward motion of pin 48 carried by member 10' of scissors linkage 9 will rotate lever 39 to open the door 35.

As the extension cycle continues, uplock lever 53 continues to rotate, compressing spring 64, until pivot 67 crosses dead center between the crankshaft 16 and pivot 65, the spring 64 then being effective to rotate lever 53 to the opposite limit of its lost motion with respect to the crankshaft. This rotation of lever 53 actuates push-pull rod 33 to slide downlock pin 31 into latching position. As the drag strut approaches its fully extended position, lug 30 strikes downlock pin 31, forcing it back against the action of spring 64 until the drag strut is fully extended, at which point pin 31 will snap into place in lug 30, locking the gear in extended position as shown in Figure 2.

To retract the gear, cylinder 14 is actuated to retract piston rod 14', thus simultaneously exerting forces on crank arms 13 and 15. The gear being locked in down position, the force on arm 13 is ineffective to swing the gear, while crankshaft 16 rotates uplock lever 53, thus withdrawing downlock pin 31 from lug 30. At this point, the rotation of the crankshaft will have moved pin 23 to the ends of slots 28 and 29, so that continued rotation of the crankshaft will start the folding motion of the drag strut and allow the force exerted by cylinder 14 to become effective to start to swing the gear toward its retracted position. As the retraction cycle continues, crankshaft 16 will rotate uplock lever 53, compressing spring 64 until pivot 67 moves past dead center between crankshaft 16 and pivot 65, the spring 64 then being effective to rotate lever 53 relative to crankshaft 16 until the bolt 54 strikes the end of the slots 58 and 59, thus moving lever 53 into latching position. As the gear approaches fully retracted position, the pin 48 engages the slot 49 in lever 39, rotating the lever about pivot 40 to close door 35. As the door swings closed, pin 51 carried by the door strikes the face 68 of uplock lever 53, forcing the lever back against the action of spring 64 until the door is fully closed, at which time lever 53 snaps into locking position, engaging pin 51 and locking the door closed. The pad 66 bearing against the lower end of cylinder member 2 of the shock strut assembly 1 holds the gear in its retracted position.

While but one embodiment of this invention has been shown and described, it should be understood that the invention is not confined to the precise details of construction herein set forth, as it is apparent that many changes and variations may be made without departing from the scope of the invention, and no limitation is intended by the phraseology of the foregoing description or illustrations in the accompanying drawings.

I claim as my invention:

1. An aircraft, landing gear mounted on said aircraft for movement between an extended operative position and a retracted position for stowage during flight, actuating means for moving said gear between said positions, downlock means for holding said gear in its fully extended position, uplock means for holding said gear in its retracted position, a lock actuating lever movably carried by said aircraft and operatively connected to said uplock means and said downlock means and movable in one direction to move said downlock means toward locking position and said uplock means toward unlocked position, and movable in the other direction to move said uplock means toward locking position and said downlock means toward unlocked position, spring means carried by said aircraft and acting against said lever, and means responsive to operation of said gear actuating means to extend said gear, for moving said lever relative to said spring means to a position wherein said spring means will urge said lever in said first direction and responsive to operation of said actuating means to retract said gear to move said lever to a position relative to said spring means wherein said spring means will urge said lever in said other direction.

2. An aircraft, landing gear mounted on said aircraft for movement between an extended operative position and a retracted position for stowage during flight, actuating means for moving said gear between said positions, a lost motion connection between said actuating means and said gear, downlock means for holding said gear in its fully extended position, uplock means for holding said gear in its retracted position, a lock actuating lever movably carried by said aircraft and operatively connected to said uplock means and said down lock means and movable in one direction to move said downlock means toward locking position and said uplock means toward unlocked position, and movable in the other direction to move said uplock means toward locking position and said downlock means toward unlocked position, spring means carried by said aircraft and acting against said lever, and means responsive to operation of said gear actuating means for extending said gear to move said lever relative to said spring means to a position wherein said spring means will urge said lever in said first direction and responsive to operation of said actuating means for retracting said gear to move said lever to a position wherein said spring means will urge said lever in said other direction, the aforesaid lost motion connection causing the initial operation of said actuating means to move said lever to unlock the appropriate lock means before said actuating means is effective to move said gear.

3. An aircraft, landing gear mounted on said aircraft for movement between an extended operative position and a retracted position for stowage during flight, actuating means for moving said gear between said positions, a first locking means for holding said gear in its fully extended position, a second locking means for holding said gear in its retracted position, and means for actuating said locking means comprising a shaft rotatably carried by said aircraft, a latch actuating lever rotatably carried by said shaft, means limiting the rotation of the lever relative to said shaft in either direction, spring means carried by said aircraft and acting against said lever and effective when said gear is extended to bias said lever in one direction about said shaft whereby said spring means tends to urge said first lock means into latching position, an operating connection between said gear actuating means and said shaft whereby operation of said gear actuating means to retract said gear will rotate said shaft in the opposite direction, the initial rotation of said shaft acting through said rotation limiting means to move said lever against the action of said spring means to unlatch said first lock means, and continued rotation thereof moving said lever relative to said spring means into a position wherein the latter will tend to rotate said lever in said opposite direction independently of said shaft so as to urge said second latch means into position to latch said gear in its retracted position, and operation of said gear actuating means to extend said gear will similarly conjointly rotate said shaft and said lever at the beginning of the extension cycle in said one direction to unlatch said second latch means, continued rotation of said shaft moving said lever relative to said spring means into a position wherein the latter will again tend to rotate said lever in said one direction independently of said shaft so as to urge said first latch means into position to latch said gear in its extended position.

4. An aircraft, landing gear mounted on said aircraft for movement between an extended operative position and a retracted position for stowage during flight, gear actuating means for moving said gear between said positions, a lost motion connection between said gear and said actuating means, a first latching means for holding said gear in its fully extended position, a second latching means for holding said gear in its retracted position, and means for actuating said latching means comprising a shaft rotatably carried by said aircraft, a latch actuating lever rotatably carried by said shaft, means limiting the rotation of said lever relative to said shaft in either direction, spring means carried by said aircraft and acting against said lever and effective when said gear is extended to bias said lever in one direction about said shaft thereby urging said first latch means into latching position, an operating connection between said gear actuating means and said shaft whereby operation of said gear actuating means to retract said gear will rotate said shaft in the opposite direction, the initial rotation of said shaft acting through said rotation limiting means to move said lever against the action of said spring means to unlatch said first latch means, the aforesaid lost motion connection delaying movement of said gear until said first latch means is unlatched, continued rotation of said shaft moving said lever relative to said spring means into a position wherein the latter will tend to rotate said lever in said opposite direction independently of said shaft so as to urge said second latch means into position to latch said gear in its retracted position, and operation of said gear actuating means to extend said gear will similarly conjointly rotate said shaft and said lever in said one direction to unlatch said second latch means at the beginning of the extension cycle, said lost motion connection delaying movement of said gear until said second latch means is unlatched, and continued rotation of said shaft moving said lever relative to said spring means into a position wherein the latter will tend to rotate said lever in said one direction independently of said shaft so as to urge said first latch means into position to latch said gear in its extended position.

5. An aircraft, landing gear mounted on said aircraft for movement between an extended operative position and a retracted position for stowage during flight, gear actuating means for moving said gear between said positions, a first latching means for holding said gear in its fully extended position, a second latching means for holding said gear in its retracted position, and means for actuating said latching means comprising a shaft rotatably carried by said aircraft, a latch actuating lever rotatably carried by said shaft, means limiting the rotation of said lever relative to said shaft in either direction, spring means comprising a spring-urged link having one end pivotally attached to said aircraft and the other end attached to said lever at a point offset from the axis of said shaft and movable with said lever to either side of a dead center position between its pivotal connection to the aircraft and said shaft axis, said spring means exerting a force tending to rotate said lever to the limit of its relative rotation with respect to said shaft in a direction depending on the location of said toggle joint with respect to its dead center position between said shaft and said pivotal connection to the aircraft, an operating connection between said gear actuating means and said shaft for rotating said shaft upon operation of said actuating means, initial rotation of said shaft acting through said limiting means to correspondingly move said lever whereby said gear actuating means is effective to conjointly rotate said shaft and said lever at the beginning of the retraction cycle in a direction to unlatch said first latch means, continued rotation of said shaft moving said lever past said dead center position so that said spring means will then rotate said lever about said shaft to the other limit of said lever's rotation relative to said shaft, thereby moving said second latch means into position to latch said gear in its retracted position, said gear actuating means being also effective to conjointly rotate said shaft and said lever at the beginning of the extension cycle in a direction to unlatch said second latch means, continued rotation of said shaft moving said lever past said dead center position so that said spring means will then tend to rotate said lever about said shaft back to its original position relative to said shaft, thereby moving said first latch means into position to latch said gear in its extended position.

6. An aircraft, means forming a compartment in said aircraft, landing gear mounted on said aircraft for movement between an extended operative position and a retracted position within said compartment for stowage during flight, actuating mechanism for moving said gear between said positions, a door movably carried by said aircraft for closing said stowage compartment, means responsive to the movement of said landing gear for opening and closing said door, said door in closed position engaging said gear whereby to mechanically hold said gear in its fully retracted position, a first locking means for holding said gear in its fully extended position, a second locking means for holding said door in its closed position, a lock actuating lever swingably carried by said aircraft and movable in one direction to move said first locking means toward locking position and said second locking means toward unlocked position and movable in the other direction to move said second locking means toward locking position and said first locking means toward unlocked position, a lost motion connection between said lever and said actuating means, spring means carried by said aircraft and acting against said lever and adapted to urge said lever to either limit of its lost motion relative to said actuating means depending on the position of said lever with respect to said spring means, the initial motion of said actuating means from either retracted or extended position acting through said connection to move said lever against the action of said spring means in a direction to unlock the appropriate lock means, further motion of said actuating means in the same direction moving said lever to a position with respect to said spring means wherein said spring means will urge said lever toward the opposite limit of its lost motion relative to said actuating means to move the other of said lock means into locking position.

7. An aircraft, means forming a stowage compartment in said aircraft, landing gear movably carried by said aircraft, gear operating means operatively attached to said landing gear for moving said gear between an extended operative position and a retracted position within said compartment, a door for said stowage compartment movably carried on said aircraft, means responsive to movement of said landing gear for opening and closing said door, said door in closed position engaging the under side of said gear when the latter is retracted into said compartment and serving to mechanically hold said gear in its fully retracted position, and latch means carried by said aircraft and actuated by said gear operating means for locking said door in closed position.

8. An aircraft and a retractable landing gear for said aircraft comprising a main strut pivotally attached to said aircraft and adapted to swing between extended and retracted positions, a crankshaft rotatably mounted in said aircraft, and a foldable strut comprising two members pivotally connected together, one end of said foldable strut being pivotally connected to said main strut, the other end being connected to said crankshaft with freedom for limited rotation relative thereto, said foldable strut being arranged to be in its folded position when said main strut is retracted, and in its extended position when said main strut is extended, a first latch means for locking said foldable strut in its extended position, power means adapted to simultaneously apply oppositely directed forces to said crankshaft and said main strut, said forces producing moments tending to rotate said crankshaft and to swing said main strut about its pivot, a door movably carried by said aircraft and adapted to be closed when said main strut is retracted, linkage means responsive to the motion of said main strut for opening and closing said door, a second latch means comprising a lever mounted on said crankshaft with freedom for limited rotation relative thereto for locking said door in closed position, said door when closed acting to hold said main strut in its retracted position, a link connecting said first and said second latch means, a spring urged compressible link pivotally attached at one of its ends to the structure of said aircraft and at its other end to said second latch means to form therewith an over-center, spring-urged toggle tending to hold said second latch means at one limit of its relative motion with respect to said crankshaft when said main strut is retracted, and at the other limit of its relative motion with respect to said crankshaft when said main strut is extended, so that when said power means is actuated to swing said main strut from its retracted position the initial rotation of said crankshaft before said power means is effective to swing said main strut will rotate said second latch means, thereby unlatching said door, and when said power means is actuated to swing said main strut from its extended position the initial rotation of said crankshaft before said power means is effective to swing said main strut will rotate said second latch means in the opposite direction, thereby unlatching said first latch means.

JOHN H. ALLEN.

References Cited in the file of this patent

UNITED STATES PATENTS

| Number | Name | Date |
| --- | --- | --- |
| 2,294,467 | Lemonier | Sept. 1, 1942 |
| 2,371,699 | Martin | Mar. 20, 1945 |
| 2,374,146 | Waters | Apr. 17, 1945 |
| 2,391,998 | Palmer | Jan. 1, 1946 |
| 2,464,972 | Franch | Mar. 22, 1949 |
| 2,504,458 | Schmidt | Apr. 18, 1950 |
| 2,562,778 | Egly | July 31, 1951 |

FOREIGN PATENTS

| Number | Country | Date |
| --- | --- | --- |
| 652,093 | Great Britain | Apr. 18, 1951 |